(12) United States Patent
Keil (10) Patent No.: US 6,439,008 B1
(45) Date of Patent: Aug. 27, 2002

(54) LOCK PROTECTOR

(76) Inventor: John S. Keil, P.O. Box 425, Ketchum, OK (US) 74349

( * ) Notice: Subject to any disclaimer, the term of this patent is extended or adjusted under 35 U.S.C. 154(b) by 0 days.

(21) Appl. No.: 09/711,745

(22) Filed: Nov. 13, 2000

(51) Int. Cl.[7] .............................................. E05B 67/38
(52) U.S. Cl. .................................................. 70/56; 70/54
(58) Field of Search ................................ 70/53–56, 14, 70/18

(56) References Cited

U.S. PATENT DOCUMENTS

| | | | | |
|---|---|---|---|---|
| 3,559,429 A | * | 2/1971 | Hermann | 70/53 |
| 4,294,088 A | * | 10/1981 | Barr | 70/56 |
| 4,760,720 A | * | 8/1988 | Grille | 70/54 |
| 4,896,518 A | * | 1/1990 | Appelgren | 70/54 |
| 5,219,384 A | * | 6/1993 | Elsfelder et al. | 70/54 X |
| 5,737,946 A | * | 4/1998 | Sole et al. | 70/54 |

* cited by examiner

Primary Examiner—Suzanne Dino Barrett (57) ABSTRACT

A device to protect a padlock with a lock body and a shackle has a plurality of walls forming an open ended, hollow structure. In one wall there is a slot to receive a hasp of a staple and hasp locking mechanism. In another wall there is a hole to be useful with a plug-type locking mechanism. Traversing two of the remaining wall is a continuous slot for use with a variety of other locking mechanisms. The hollow structure is square in cross-sectional dimension and is sufficiently large to admit a padlock through one of its open ends and long enough to allow a padlock to completely enter therein through one of the open ends.

2 Claims, 10 Drawing Sheets

LOCK PROTECTOR

FIELD OF THE INVENTION

The present invention relates to a device that serves as a protective cover for a padlock when the padlock is secured to a staple of a hasp or similar element of a locking mechanism, and more particularly to a padlock protector useful with a variety of locking systems.

DESCRIPTION OF RELATED ART

A variety of devices have been devised for protecting a padlock from being attacked by thieves employing bolt cutters. However, most of them either are too light weight to be effective in protecting the padlock from attack, do not provide easy access to the padlock for the person seeking to unlock the padlock, are complex and costly to manufacture, or do not fully cover the padlock's shackle and the staple of the hasp or similar element of a locking mechanism.

In addition, the prior padlock protection device designs are useful in only a specified type of lock and not useful with a variety of locking devices such as staple and hasp, trailer hitch, barrel bolt, or plug hasp locking devices when used with a padlock.

U.S. Pat. No. 1,244,404 to Ankovitz discloses a padlock shield for protecting a padlock used with a staple and hasp locking system and has a back, front and cover.

U.S. Pat. No. 3,718,014 to Delgadillo discloses an asserted burglar-proof locking device for use with a staple and hasp locking system.

U.S. Pat. No. 3,828,591 to Beaver discloses a lock assembly with a guard to surround three sides of a padlock used in a staple and hasp locking mechanism.

U.S. Pat. No. 4,760,720 to Grille discloses a padlock protector having a cylindrical design with cut-outs for latching devices and includes a rod rigidly mounted on the inside.

U.S. Pat. No. 4,879,889 to DeForrest discloses a shackle protector of a padlock used in a hasp locking mechanism and has a first and second plate, each having aligning slots therein to receive a hasp.

U.S. Pat. No. 4,896,518 to Applegren discloses a structure to protect a portion of a padlock shackle when used in a hasp locking system.

U.S. Pat. No. 4,977,763 to Sewell discloses a device to protect a padlock when used in a barrel-style, sliding, locking system showing a hollow, capped structure with two slots therethrough, one of which is located at a radius corner of two adjacent side walls.

U.S. Pat. No. 5,426,959 to Kies shows a guard for enclosing the shackle of a padlock used in a hasp locking system having three open sides and a rod between two opposite side walls.

U.S. Pat. No. 5,174,135 to Loughlin discloses a tubular hasp for padlocks that has two tubular elements separately attachable to a closure device.

U.S. Pat. No. 5,219,384 to Elsfelder et al. shows a device to protect a padlock connecting two looped ends of a cable. The device is an open-ended, hollow structure with two slots, one each of opposing walls, connecting with one of the open ends, and an angling member to receive the lock shackle.

U.S. Pat. No. 4,380,160 to Hoffman discloses a trailer tow locking device and has a base plate with a tongue to mate with a slot in a top plate that also has three sided cover member integral therewith.

U.S. Pat. No. 4,756,172 to Weaver discloses a trailer lock for use with trailers having a tongue with a ball socket to engage with a hitch ball. A lock guard for a padlock is also shown.

U.S. Pat. No. 3,606,423 to McCarthy shows a lock protecting assembly having walls with a slot through for use with a latch that has a notch formed therein.

U.S. Pat. No. 3,415,085 to Eble discloses a lock for a truck trailer, the device has a shroud for covering the grooved king pin of such trailers and a locking member for detachable securing the shroud about the king pin.

None of the above identified patents teach or suggest the present invention.

SUMMARY OF THE INVENTION

A primary object of the present invention is to provide a device to protect a padlock useful with a variety of locking systems.

A related object of the present invention is to avoid needing a separate padlock protective device for use with different locking systems.

In accordance with a preferred embodiment of the present invention, a device for protecting a lock comprises a plurality of sections forming an open ended hollow structure, a slot in one of the sections, a hole in one of the sections, and a continuous slot traversing at least a portion of two adjacent sections.

Other advantages of the present invention will become apparent from the following descriptions, taken in connection with the accompanying drawings, wherein, by way of illustration and example, an embodiment of the present invention is disclosed.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

Figure 1A:
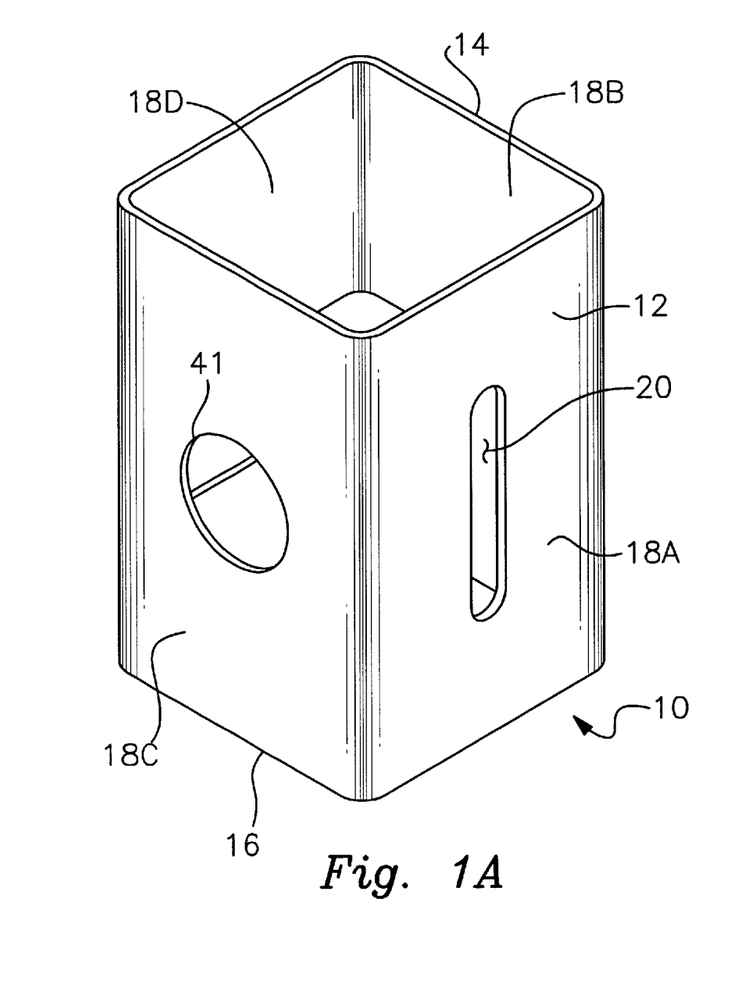
FIGS. 1A and B are different perspective views of the same device to protect a padlock constructed in accordance with a preferred embodiment of the present invention.
Figure 1B:
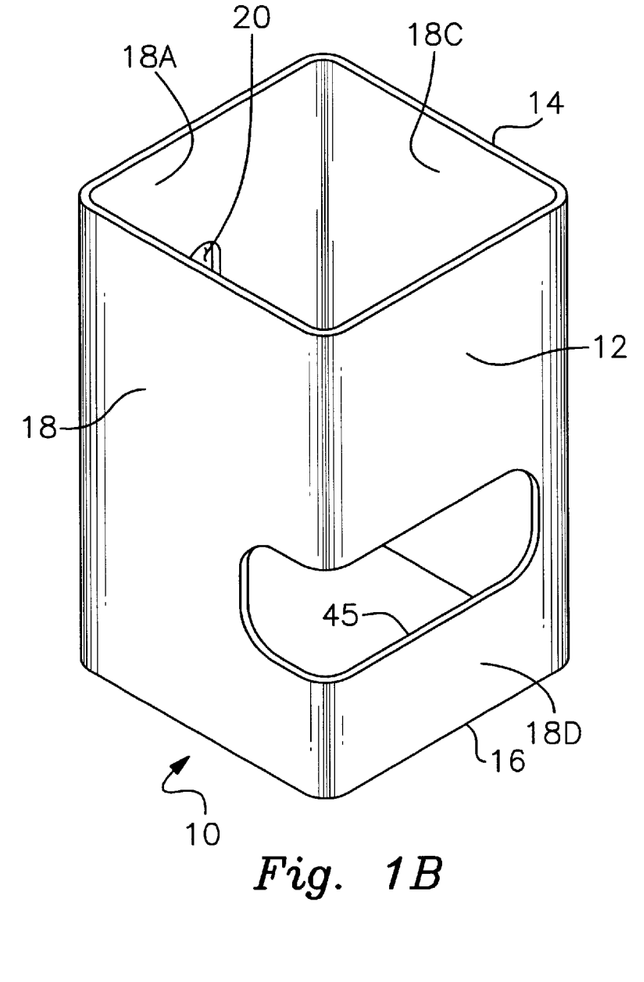

Referring now to the drawings and initially to FIG. 1, there is illustrated lock protective device 10 constructed in accordance with a preferred embodiment of the present invention. The device is a hollow tube 12 with opposite ends 14 and 16 opening into hollow tube 12. Although tube 12 is illustrated in the drawings as having straight walls 18A, 18B, 18C, 18D, the invention is not so limited, and the tube 12 may be circular in cross sectional dimension having cylindrically shaped sectioned walls. Alternately, almost any cross sectional shape may be employed as appropriate for specific circumstance, such as 3, 5, 6 etc., sided.

Figure 2A:
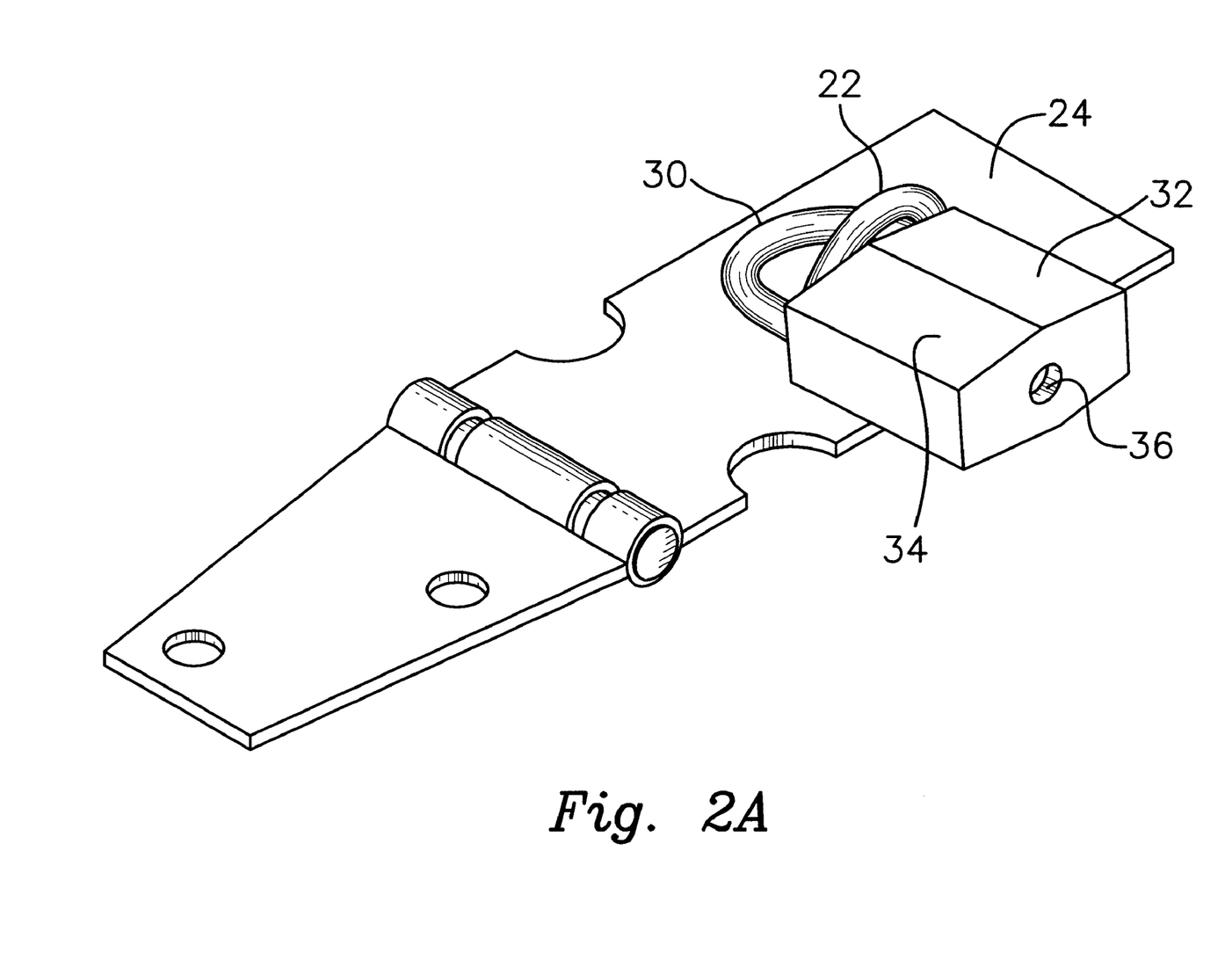
FIGS. 2A and B are perspective views of a staple and hasp locking system unprotected and protected, respectively, using the device of FIG. 1.
Figure 2B:
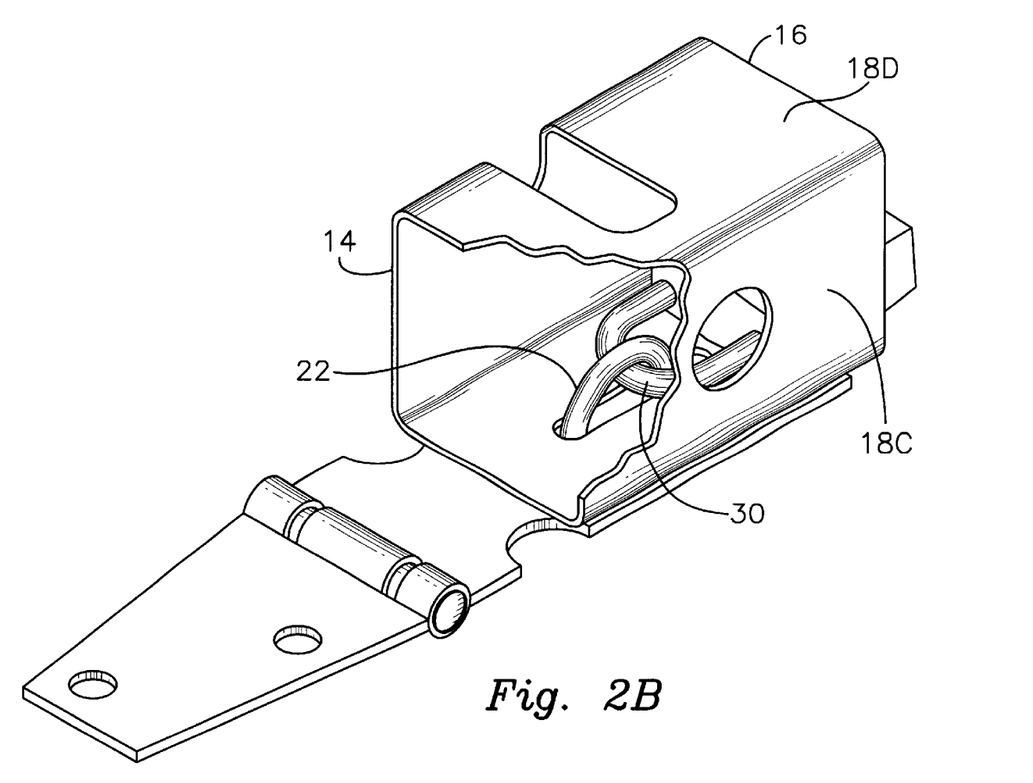

Tube 12 is provided with slot 20 in one of its walls 18A. Slot 20 extends completely through wall 18A so that slot 20 is wide enough to removably receive staple 22 of hasp 24, as illustrated in FIGS. 2A and 2B. Although slot 20 is illustrated in the drawings as extending lengthwise through wall 18A of tube 12, the invention is not so limited and, depending upon the locking device to be employed, may extend crosswise through wall 18A of tube 12.

Usage of device 10 in connection with a staple and hasp locking system is illustrated in FIGS. 2A and 2B. As shown, hasp 24 may be provided on any storage container, not shown, as a way to secure a storage container adhered to hasp 24 against access. Hasp 24 is provided with the staple 22 which inserts through slot 20 and is then releasably engaged by shackle 30 provided on padlock 32. Padlock 32 must be inserted into one end, either 14 or 16, of hollow tube 12 to engage staple 22. Both ends 14 and 16 of tube 12 are open to allow access to both shackle 30 and body 34 of padlock 32 to facilitate locking of padlock 32. Open ends 14 and 16 also allow access to padlock 32 to unlock the padlock 32 by employing a padlock key that inserts into key opening 36 provided in body 34 of padlock 32. Alternately, padlock 32 may be opened by a combination locking mechanism that is conventionally provided in the body of some padlocks instead of key openings.

Device 10 is preferably constructed of a sturdy material, such as for example steel, so that device 10 is rigid and cannot be easily broken, cut or beaten off of padlock 32 and staple 22.

Figure 3A:
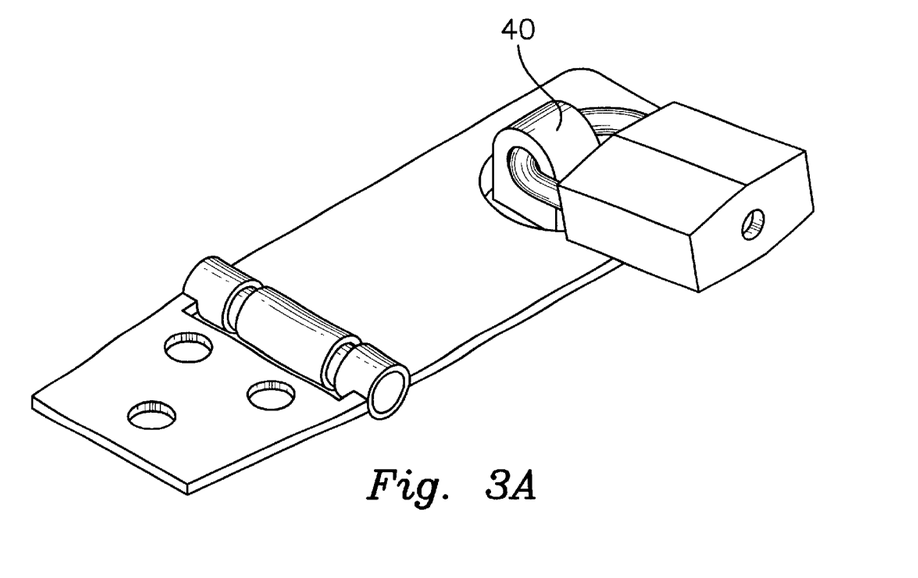
FIGS. 3A and 3B are perspective views of a plug-type hasp locking system unprotected and protected, respectively, using the device of FIG. 1.
Figure 3B:
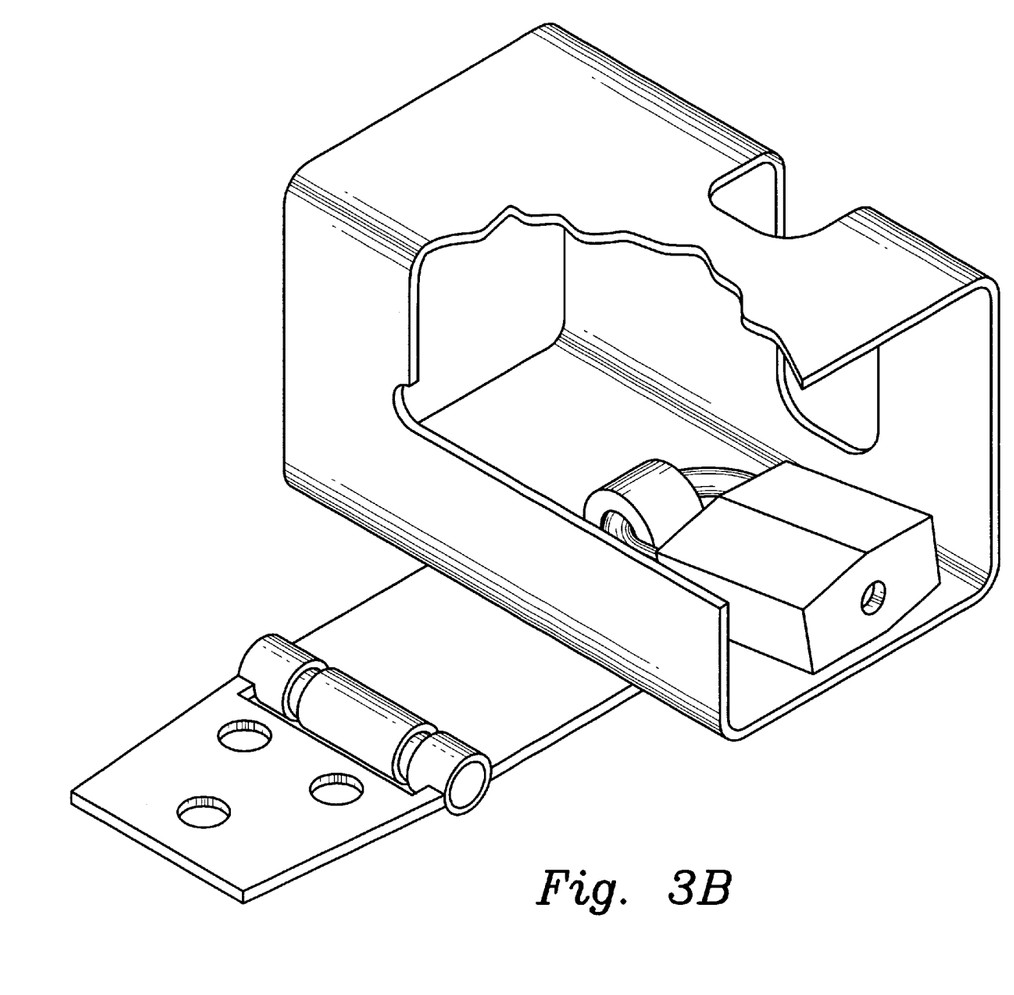

Turning now to FIGS. 3A and 3B, there is shown a plug and hasp type locking system, both unprotected and protected with device 10. By the hole 41 in one of the walls 18 of device 10, a padlock used in a plug type of locking system may be protected. In such a system, plug would be inserted in hole 41 and shackle of padlock 32 would be inserted, inside the hollow structure of device 10, through the plug hole. Such a system would not adequately lend itself to use with the slot 20 on one of the walls of device 10 due to the inherent distance needed for slot 20 that would naturally provide too much play within device 10 to protect the padlock if used in a plug type locking system. As is illustrated, plug 40 is similar to staple 22 in its operation, though in construction varies such that slot 20 is not appropriate for receiving plug 40. In such a situation, wall 18C is shown with hole 41 to receive plug 40. It can now be appreciated that device 10 may be used for a variety of locking systems. Further examples follow.

Figure 4A:
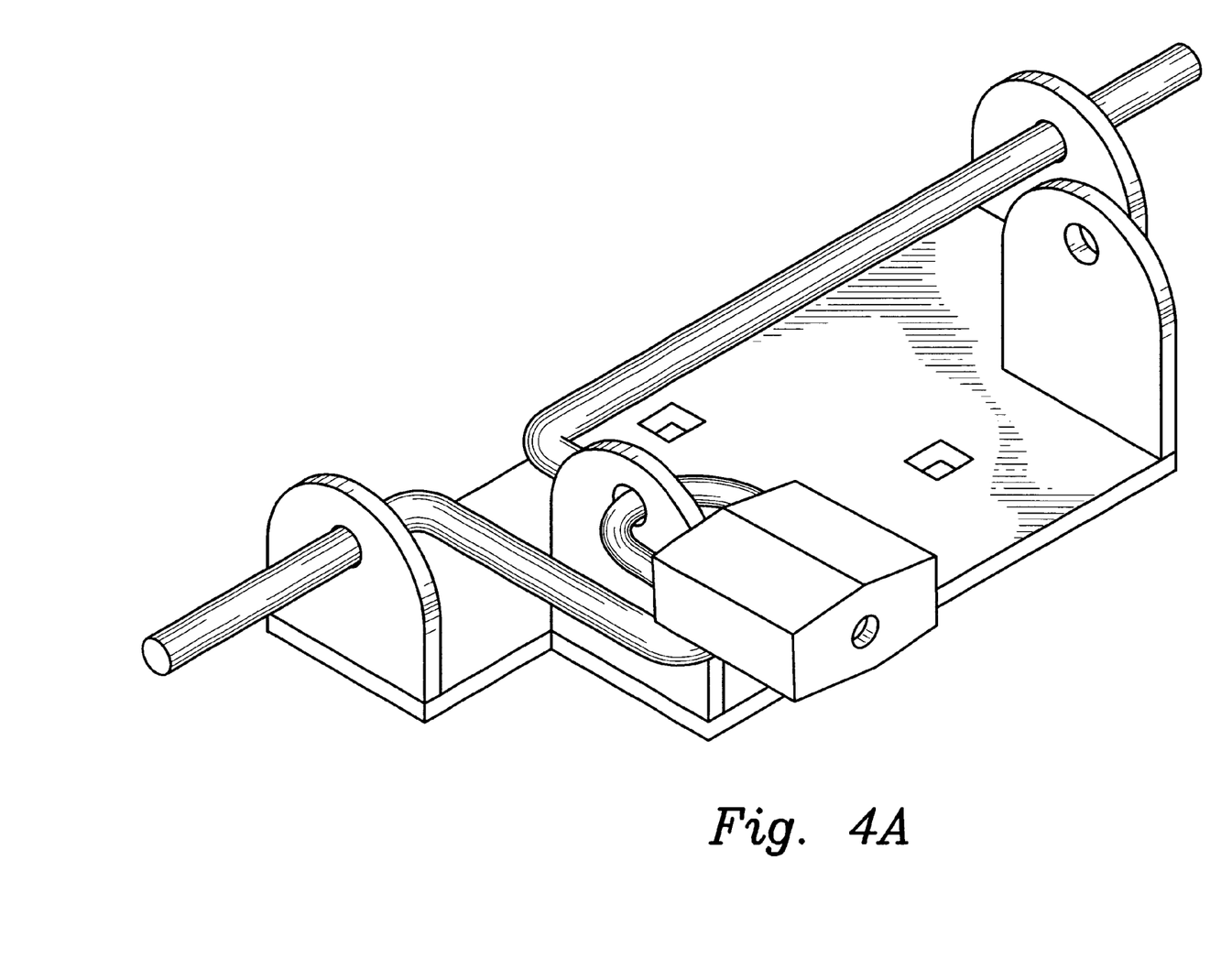
FIGS. 4A and 4B are perspective views of one type of barrel locking system unprotected and protected, respectively, using the device of FIG. 1.
Figure 4B:
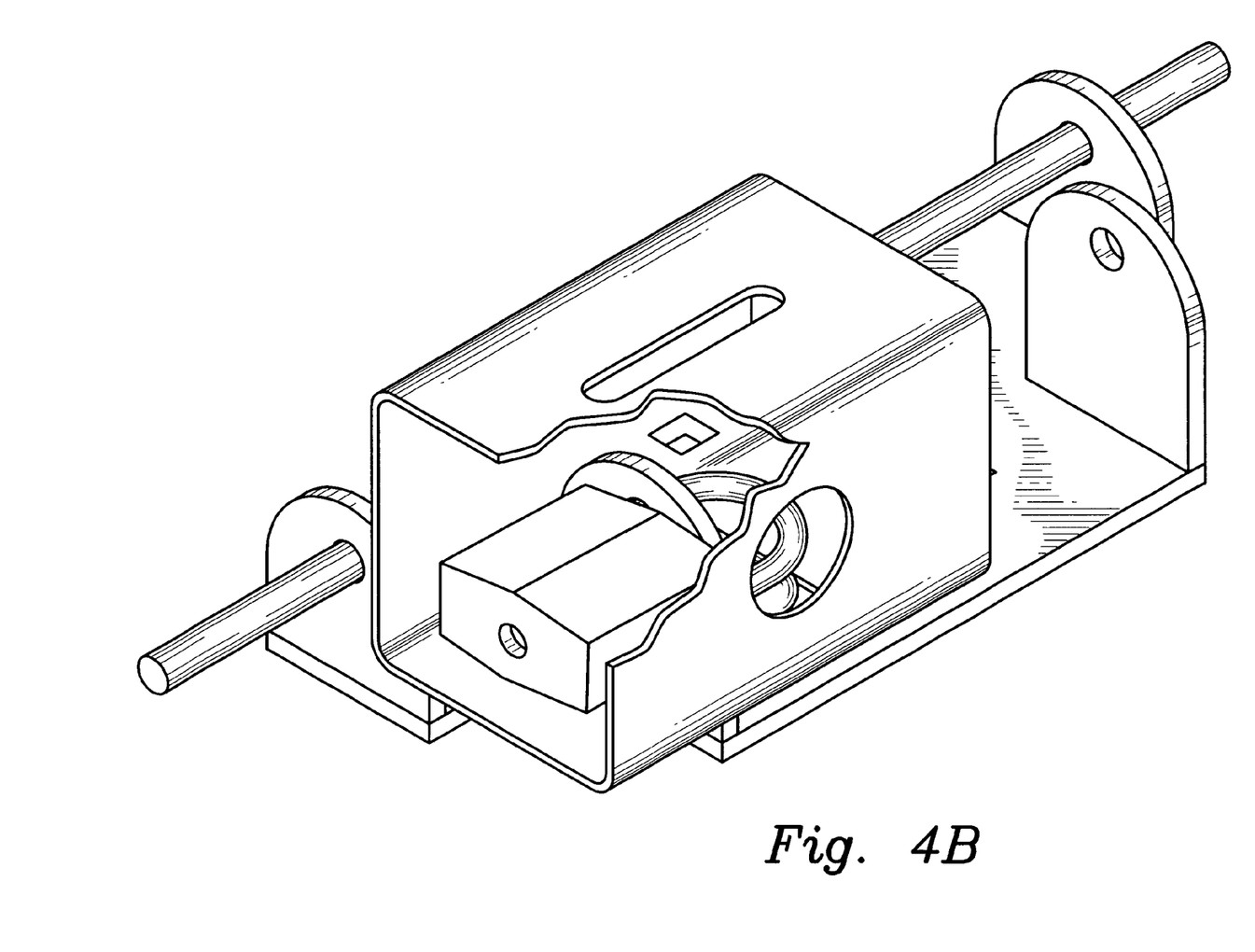
Figure 5A:
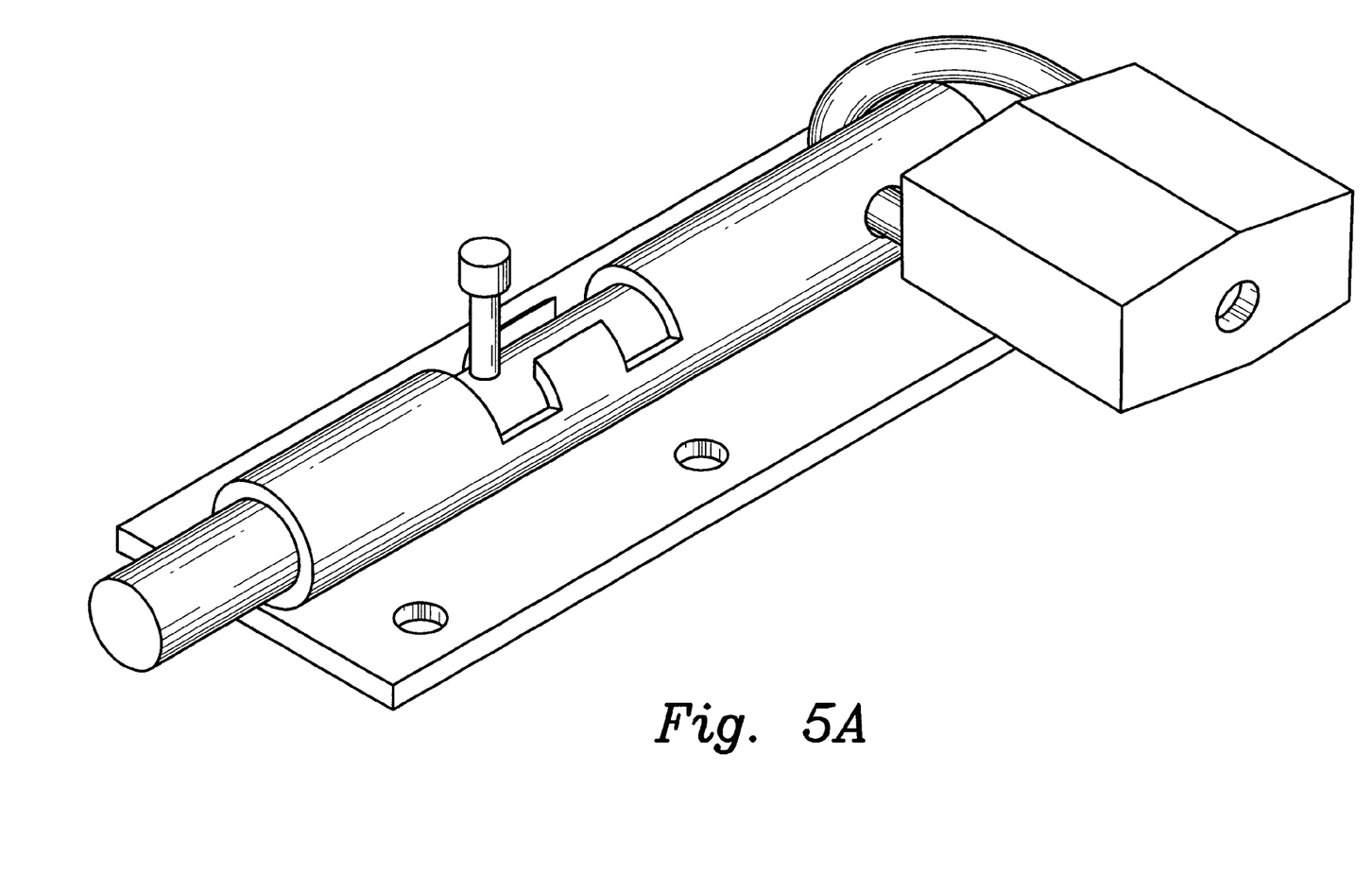
FIGS. 5A and 5B are perspective views of another type of barrel locking system unprotected and protected, respectively, using the device of FIG. 1.
Figure 5B:
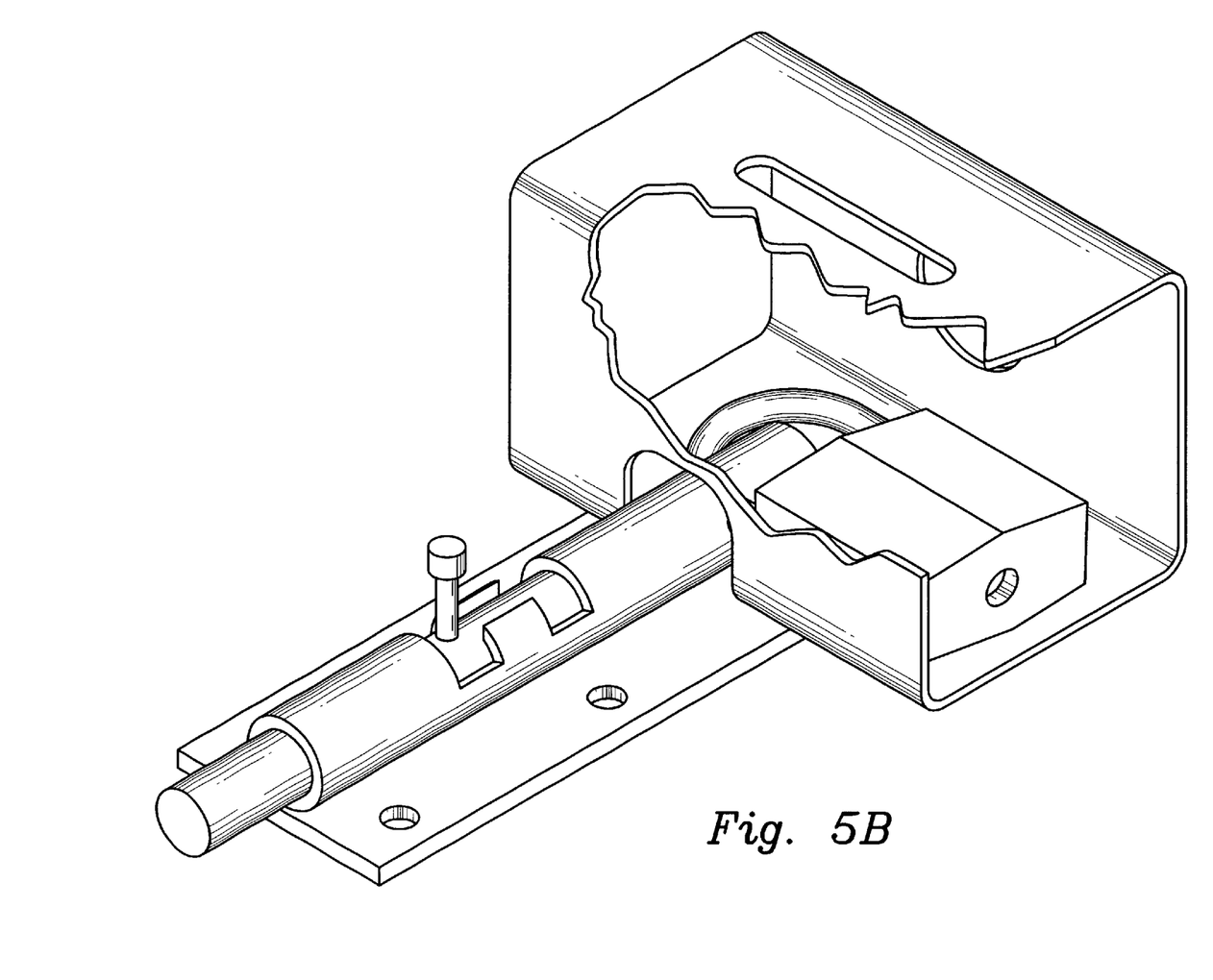
Figure 6A:
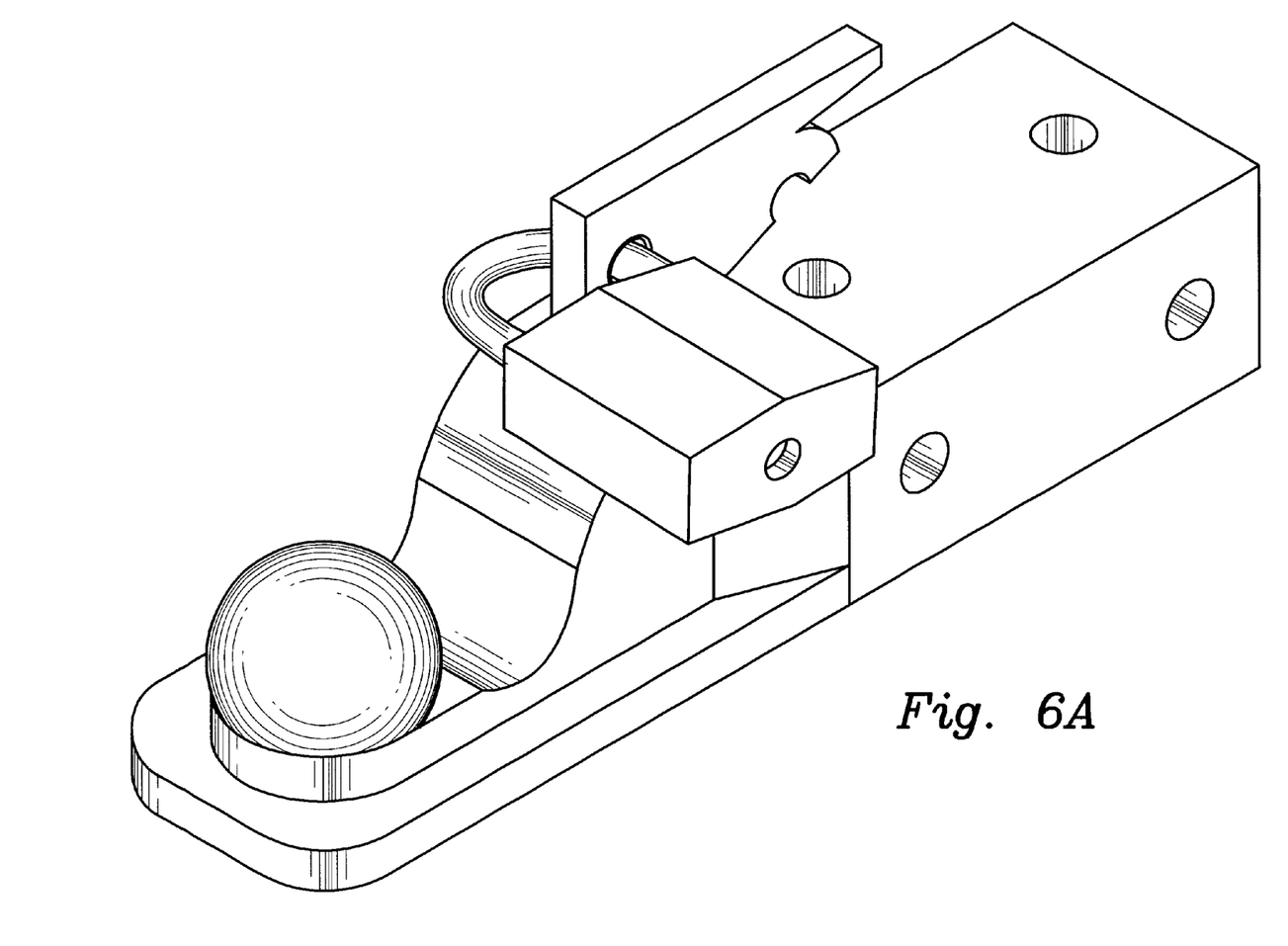
FIGS. 6A and 6B are perspective views of a trailer hitch locking system unprotected and protected, respectively, using the device of FIG. 1.
Figure 6B:
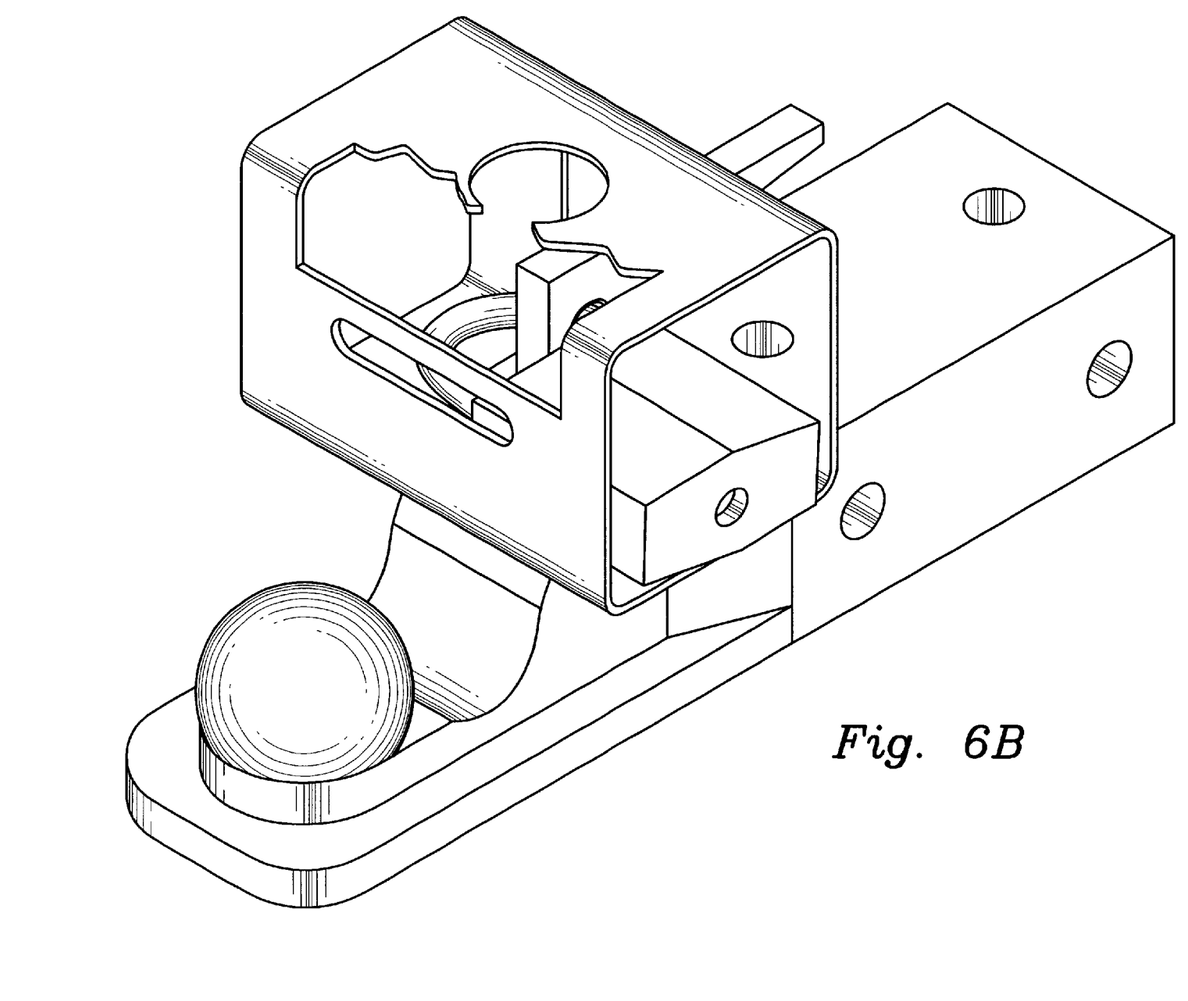

As illustrated by FIGS. 4A, 4B, 5A, and 5B, device 10 is also provided with a continuous slot traversing a portion of two adjacent walls. In this manner, lock protective device 10 may be employed in locking systems that do not allow for such flat situations as in plug or staple and hasp locking systems when a padlock would be used. For example, in barrel type locking systems where a rod of the locking system would need access through two adjacent walls of the device 10, such slot and hole arrangements are not useful. Slot 45 is continuous from one side wall of device 10 to an adjacent wall of device 10 so that device 10 is useful when housing padlock 32 used in barrel type locking systems or trailer hitch type locking systems where the latching mechanism of the locking system is of a different type than quite close to container being locked. A first such system is shown in FIGS. 4A and 4B, where neither wall 18A, nor wall 18C is appropriate, due to the configuration of the locking system. In such a situation, walls 18B and 18D are useful, as they traverse a portion of the two adjacent walls to accommodate the barrel locking system. An addition and alternate type of barrel locking system is illustrated in FIGS. 5A and 5B where device 10 is positioned at the end to accommodate the padlock and barrel system Turning to FIGS. 6A and 6B, there is illustrated a trailer hitch locking system that is likewise shown protected at FIG. 6B employing the slot traversing walls 18B and 18D.

It will be appreciated that device 10 can be employed in a variety of locking systems for the illustrations above discussed.

While the invention has been described with a certain degree of particularity, it is manifest that many changes may be made in the details of construction and the arrangement of components without departing from the spirit and scope of this disclosure. It is understood that the invention is not limited to the embodiments set forth herein for the purposes of exemplification, but is to be limited only by the scope of the attached claim or claims, including the full range of equivalency to which each element thereof is entitled.

What is claimed is:

1. A device to protect a lock that has a lock body and a shackle comprising:

a plurality of walls forming a hollow structure having two open ends;

a slot in one of the plurality of walls;

a hole in one of the plurality of walls; and a continuous slot traversing a portion of two adjacent walls.

2. A device according to claim 1 wherein said tube is square in cross-sectional dimension and is sufficiently large to admit a padlock through one of the open ends.

* * * * *